United States Patent
Widenor

(10) Patent No.: US 10,919,263 B2
(45) Date of Patent: Feb. 16, 2021

(54) CARBAMATE RESIN FOR POLYURETHANE ADHESION

(71) Applicant: Bridgestone Americas Tire Operations, LLC, Nashville, TN (US)

(72) Inventor: Ross W. Widenor, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 48 days.

(21) Appl. No.: 16/320,544

(22) PCT Filed: Jul. 27, 2017

(86) PCT No.: PCT/US2017/044162
§ 371 (c)(1),
(2) Date: Jan. 25, 2019

(87) PCT Pub. No.: WO2018/022876
PCT Pub. Date: Feb. 1, 2018

(65) Prior Publication Data
US 2019/0270276 A1     Sep. 5, 2019

Related U.S. Application Data

(60) Provisional application No. 62/367,677, filed on Jul. 28, 2016.

(51) Int. Cl.
*B32B 7/10*     (2006.01)
*B32B 25/04*    (2006.01)
(Continued)

(52) U.S. Cl.
CPC .......... *B32B 7/10* (2013.01); *B32B 25/02* (2013.01); *B32B 25/08* (2013.01); *B32B 25/12* (2013.01);
(Continued)

(58) Field of Classification Search
None
See application file for complete search history.

(56) References Cited

U.S. PATENT DOCUMENTS 2,905,582 A * 9/1959 Coleman, Jr. .......... C09J 175/00
                                                     156/310
3,939,294 A   2/1976 Fieldhouse
(Continued)

FOREIGN PATENT DOCUMENTS

EP   2199110 A2    6/2010
JP   2009227846 A  10/2009

OTHER PUBLICATIONS

English abstract of CN202448680, Sep. 26, 2012, 3 pages, China.*
International Search Report as published in corresponding PCT Publication No. WO/2018/022876; Published: Feb. 1, 2018.

*Primary Examiner* — Tae H Yoon
(74) *Attorney, Agent, or Firm* — Meredith E. Hooker; J. Gregory Chrisman

(57) ABSTRACT

A composite of a rubber layer and a polyurethane substrate are adhered together without the need for a separate adhesive layer. An adhesion-promoting composition incorporated into the rubber layer provides the means for adhereing the rubber layer to the polyurethane substrate. The adhered layered composition may be used in many applications including the construction of tires.

15 Claims, 1 Drawing Sheet

(51) Int. Cl.
*B32B 27/40* (2006.01)
*B32B 25/08* (2006.01)
*B32B 25/12* (2006.01)
*B32B 25/16* (2006.01)
*B32B 25/18* (2006.01)
*B32B 25/02* (2006.01)
*B60C 1/00* (2006.01)

(52) U.S. Cl.
CPC .............. *B32B 25/16* (2013.01); *B32B 25/18* (2013.01); *B32B 27/40* (2013.01); *B32B 2270/00* (2013.01); *B32B 2605/00* (2013.01); *B60C 1/0016* (2013.01)

(56) References Cited

U.S. PATENT DOCUMENTS

| | | | |
|---|---|---|---|
| 4,647,328 A | 3/1987 | Rhee | |
| 5,279,784 A * | 1/1994 | Bender | B29D 30/52 156/128.1 |
| 5,462,617 A | 10/1995 | Bender et al. | |
| 5,951,797 A | 9/1999 | Majumdar et al. | |
| 6,186,202 B1 | 2/2001 | Majumdar et al. | |
| 6,624,283 B2 | 9/2003 | Viegas et al. | |
| 7,231,948 B2 * | 6/2007 | Forney, III | B29C 39/08 152/310 |
| 8,846,792 B2 * | 9/2014 | Keung | B60C 1/0008 152/450 |
| 9,062,189 B2 | 6/2015 | Rodgers et al. | |
| 2004/0127652 A1 | 7/2004 | Majumdar et al. | |
| 2005/0199327 A1 | 9/2005 | Maeda | |
| 2005/0205181 A1 | 9/2005 | Forney | |
| 2012/0095152 A1 | 4/2012 | Schfer | |
| 2014/0144573 A1 | 5/2014 | Blok et al. | |
| 2015/0119527 A1 | 4/2015 | Schafer | |

\* cited by examiner

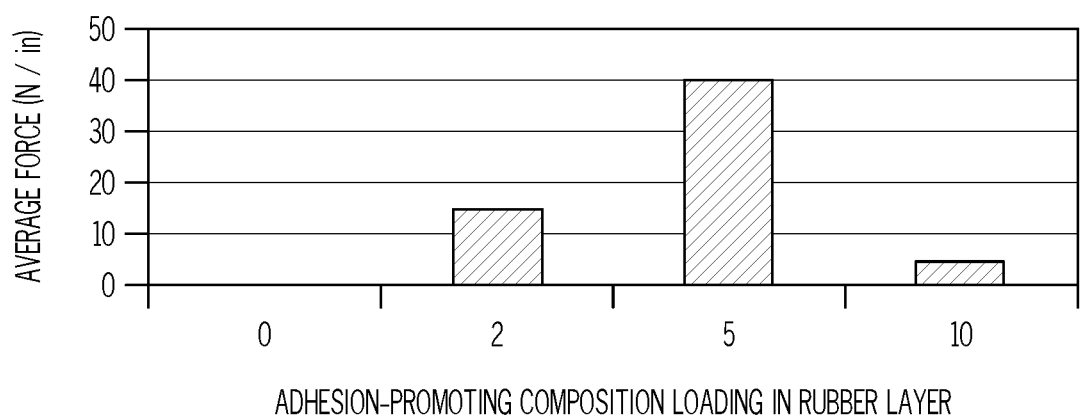

CARBAMATE RESIN FOR POLYURETHANE ADHESION

TECHNICAL FIELD

The present disclosure relates to methods for adhering rubber compositions to polyurethane to form a rubber-polyurethane composite and, more particularly, rubber compositions containing a carbamate resin adhered to a polyurethane substrate.

BACKGROUND

Achieving high bond strength in the adhering of dissimilar materials such as cured rubber and polyurethane has been known to be difficult. For instance, an intermolecular interaction of the polar nature of a polyurethane surface and the non-polar nature of a cured olefinic rubber surface is not favorable at the interface of the two different surfaces. Various methods have been developed thus far to improve the adhesion of polyurethane to cured olefinic rubber. However, these methods usually rely on the separate application of an adhesive composition, which may include multiple components, to at least one of the surfaces being adhered together and thus forming an adhesive layer. These adhesives are typically based on polyurethanes or polyisocyanates that undergo a chemical reaction to form a polyurethane.

It is an objective of the present disclosure to alleviate or overcome one or more difficulties related to the prior art. It has been found that an adhesion between a rubber composition and a polyurethane substrate can be achieved without the need for a surface application of a separate adhesive composition. The incorporation of an adhesion-promoting composition that includes an alkyl urethane and an aldehyde into a rubber compound provides enhanced adhesion between a rubber composition and a polyurethane substrate.

SUMMARY

In a first aspect, there is a composite that includes at least two layers. One layer is a rubber layer having a first layer surface and the rubber layer also includes an adhesion-promoting composition and the adhesion-promoting composition contains an alkyl urethane and an aldehyde. The second layer is a polyurethane substrate that is adjacent to the rubber layer and also has a first substrate surface.

In an example of aspect 1, the alkyl urethane is selected from:

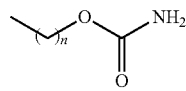

wherein n=2 to 4.

In another example of aspect 1, the alkyl urethane is butyl urethane.

In another example of aspect 1, the aldehyde is formaldehyde.

In another example of aspect 1, the molar ratio of aldehyde to alkyl urethane is from 0.1:1 to 0.5:1.

In another example of aspect 1, the rubber layer contains 0.1 to 10 weight parts of the adhesion-promoting composition per 100 weight parts of rubber.

In another example of aspect 1, the rubber layer contains at least 2 weight parts of the adhesion-promoting composition per 100 weight parts of rubber.

In another example of aspect 1, the first layer surface of the rubber layer is facing the first substrate surface of the polyurethane substrate.

In another example of aspect 1, the first substrate surface of the polyurethane substrate layer is in direct contact with the first layer surface of the rubber layer.

In another example of aspect 1, the rubber layer includes a tread surface.

In another example of aspect 1, the rubber layer underlies a tread portion of a tire.

In another example of aspect 1, the composite is a portion of a tire.

In another example of aspect 1, the tire is a non-pneumatic tire.

In another example of aspect 1, the polyurethane substrate includes at least 90 weight percent of polyurethane.

In another example of aspect 1, the rubber layer also includes a reinforcing filler such as carbon black or silica.

In another example of aspect 1, the rubber layer also includes styrene butadiene rubber, polyisoprene rubber, polybutadiene rubber, or natural rubber.

The first aspect may be provided alone or in combination with any one or more of the examples of the first aspect discussed above.

In a second aspect, the rubber composition is adhered to a polyurethane substrate by a) mixing a composition, which includes an alkyl urethane and an aldehyde, with a rubber compound to form a treated rubber compound; b) curing the treated rubber compound by heating to form a cured rubber compound; c) contacting the cured rubber compound to the polyurethane substrate to form a composite; and d) heating the composite of the cured rubber compound and the polyurethane substrate.

In an example of aspect 2, the alkyl urethane is selected from:

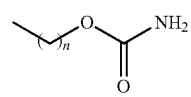

wherein n=2 to 4.

In another example of aspect 2, the aldehyde is formaldehyde.

In another example of aspect 2, the molar ratio of the aldehyde to the alkyl urethane is from 0.1:1 to 0.5:1.

In another example of aspect 2, the treated rubber compound including 0.1 to 10 weight parts of the composition per 100 weight parts of rubber.

In another example of aspect 2, the composition is present in the treated rubber compound in at least 2 weight parts per 100 weight parts of rubber.

In another example of aspect 2, step 'b' includes maintaining the treated rubber compound at a temperature in the range of 130° C. to 180° C. for a time period in the range of 15 minutes to 45 minutes.

In another example of aspect 2, step 'd' includes maintaining the composite at a temperature in the range of 130° C. to 180° C. for a time period in the range of 15 minutes to 45 minutes.

In another example of aspect 2, the composite is a portion of a tire.

The second aspect may be provided alone or in combination with any one or more of the examples of the second aspect discussed above, or with any one or more of the examples of the first aspect. The accompanying drawing is included to provide a further understanding of principles of the invention, and is incorporated in and constitutes a part of this specification. The drawing illustrates one or more embodiment(s), and together with the description serves to explain, by way of example, principles and operation of the invention. It is to be understood that various features disclosed in this specification and in the drawing can be used in any and all combinations. By way of non-limiting example the various features may be combined with one another as set forth in the specification as aspects.

BRIEF DESCRIPTION OF THE DRAWING

The above description and other features, aspects and advantages are better understood when the following detailed description is read with reference to the accompanying drawings, in which:

FIG. 1 shows the adhesion strength (N/in) of a rubber layer adhered to a polyurethane substrate.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

As used herein, the term "phr" means the parts by weight of rubber. If the rubber composition comprises more than one rubber, "phr" means the parts by weight per hundred parts of the sum of all rubbers.

The present disclosure relates to the adhesion of elastomer or rubber compositions, such as a rubber-containing layer or vulcanizable rubber compositions, to polyurethane compositions. The terms elastomer and rubber will be used interchangeably in this specification. The adhesion between the rubber composition and the polyurethane composition can be accomplished without the presence of a separate adhesive composition application, for example, disposed between the two compositions being adhered. The rubber-containing compositions preferably include an adhesion-promoting composition, for example a composition containing a carbamate compound.

In general, common adhesives are used for adhering rubber to polyurethane. Such adhesives have been based on polyurethanes by means of a chemical reaction between a diisocyanate and an alcohol, such as a diol, with the optional use of a curative agent such as a diamine. The bonding surfaces of the rubber and polyurethane compositions are then prepared by a buffing process that cleans and abrades the bonding surface. The bonding surfaces sometimes need an initial application of a priming agent before the adhesive is applied. The polyurethane adhesive then has to be applied at a desired thickness to at least one and perhaps both of the buffed bonding surfaces of the rubber and/or polyurethane substrate. The present disclosure provides a rubber-polyurethane composite having the two layers adhered to one another, preferably without the presence of a separate adhesive formation or application steps. The present disclosure shows that modifying a rubber mixture by incorporating an adhesion-promoting composition provides a rubber surface that is ready to be bonded to a polyurethane substrate. The modified rubber mixture can be further treated by curing the modified rubber compound and optionally buffing (e.g., with a sander) the adhesion surface. The adhesion-promoting composition may not function as an adhesive by itself, as in the case of polyurethane adhesives, but it can enhance the adhesion of a rubber composition to a polyurethane substrate and thus function as an adhesive in a rubber-containing composition.

The elastomeric composition can include one or more elastomeric materials. For example, a variety of materials may be utilized as the elastomeric or rubber layer. Examples include polybutadiene, polyisoprene, natural rubber, ethylene-propylene diene copolymers (EPDM), ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly (isobutylene-co-isoprene), polyacrylates, polyesters, polyethers, fluoroelastomers, silicone elastomers, copolymers of ethylene, and combinations thereof, and other low modulus polymers and copolymers. Also useful are blends of different elastomeric materials, or blends of elastomeric materials.

In one or more embodiments, block copolymers of conjugated dienes and vinyl aromatic monomers can be used to form the rubber layer. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers.

In another embodiment, the rubber layer can be a rubber layer including a rubber compound selected from the group consisting of a blend of natural rubber and styrene butadiene; a blend of natural rubber and polybutadiene; and a blend of natural rubber, styrene butadiene, and polybutadiene.

In certain embodiments, at least 60% by weight (at least 60 phr), at least 70% by weight (at least 70 phr), at least 80% by weight (at least 80 phr), at least 90% by weight (at least 90 phr), at least 95% by weight (at least 95 phr), or even 100% by weight (100 phr) of the rubber composition contains at least one of: natural rubber, synthetic polyisoprene rubber, polybutadiene rubber, and styrene-butadiene rubber.

The rubber compositions of the present disclosure may further include, if desired, various appropriate additional compounding ingredients as known in the art, e.g., oils, pigments, extenders, surfactants, stabilizers, softeners (e.g., wax, stearic acid, zinc), resins (adhesives), vulcanizing agents (e.g., sulfur) and anti-oxidants. In another example, non-carbon black reinforcing agent such as silica, clay or calcium carbonate may be used in an appropriate amount in combination with carbon black.

In one or more embodiments, the rubber composition can include 5 to 200 phr of at least one reinforcing filler. One or more than one reinforcing filler may be utilized in the rubber compositions according to the embodiments disclosed herein. In certain embodiments disclosed herein, the total amount of the reinforcing filler is 5 to 200 phr, including 10 to 200 phr, 10 to 175 phr, 25 to 150 phr, 35 to 150 phr, 25 to 125 phr, 25 to 100 phr of at least one reinforcing filler. In certain embodiments disclosed herein, the at least one reinforcing filler includes at least one of: carbon black or silica. In such embodiments, the at least one reinforcing filler includes at least one carbon black, at least one silica, or at least one carbon black and at least one silica. In certain embodiments disclosed herein, the at least one reinforcing filler includes at least one of: carbon black or silica, and further includes at least one additional reinforcing filler. In such embodiments, the at least one reinforcing filler includes at least one carbon black and at least one additional reinforcing filler (other than silica), at least one silica and at least one additional reinforcing filler (other than carbon black), or at least one silica and at least one carbon black and at least one additional reinforcing filler (other than the carbon black or silica).

In one or more embodiments, the rubber composition may include an adhesion-promoting composition for promoting adhesion of the rubber composition to polyurethane. In one example, the adhesion-promoting composition can be a carbamate or urethane compound. Preferably, the adhesion-promoting composition includes alkyl urethane, an aldehyde or mixtures of an alkyl urethane and an aldehyde. In one example, the adhesion-promoting composition can include an alkyl urethane and an aldehyde and no other components. The molar ratio of alkyl urethane to aldehyde in the adhesion-promoting composition can be from 1:0.1 to 1:0.5, and preferably from 1:0.2 to 1:0.4.

The adhesion-promoting composition may be added to the rubber composition to provide an enhanced adhesion property to the rubber composition, and in particular, an increased adhesion to polyurethane as compared to the same rubber composition without the incorporation of the adhesion-promoting composition. In one or more embodiments, the rubber compositions of the present disclosure can contain an adhesion-promoting composition in an amount of 0.1 to 15 phr, 0.5 to 12 phr, 1 to 10 phr, 2 to 8 phr or 3, 4, 5, 6 or 7 phr.

The alkyl urethane in the adhesion-promoting composition can be selected from the below chemical structure.

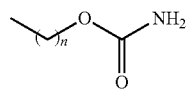

wherein n=2-4.

Examples of an alkyl urethane suitable for inclusion in the adhesion-promoting composition include propyl carbamate, butyl carbamate, pentyl carbamate and combinations thereof.

The aldehyde in the adhesion-promoting composition can be, for example, formaldehyde or acetaldehyde.

In one embodiment, the adhesion-promoting composition can include a combination of butyl carbamate or urethane and formaldehyde, for example, at a butyl carbamate to formaldehyde ratio of 1:0.1 to 1:0.5.

The rubber compositions of the present disclosure can be in the form of any suitable shape, for example, a layer, that can be brought into contact with a polyurethane compound for adhering the rubber composition to the polyurethane compound. In one example, the rubber composition can be in the form of a tire component. Some examples of tire components can include treads, sidewalls, or a carcass.

To form the composite, the rubber composition containing the adhesion-promoting component is bonded to a polyurethane. For example, the rubber composition can be in the form of a rubber layer having a surface for contacting the polyurethane, which can be in the form of a compound or layer (e.g., substrate) having a surface for contacting the rubber composition. A variety of polyurethane compositions, including mixtures thereof, may be employed in the present disclosure for adhering to the rubber compositions. For instance, polyurethane compositions can be formed by the combination of various diisocyanates, and/or polymeric isocyanates with various monomeric alcohols and/or polymeric alcohols.

Examples of diisocyanates include but are not limited to toluene diisocyanates, xylene diisocyanates, cumene diisocyanates, methylene diphenyl diisocyanates, hexamethylene diisocyanates, tetramethylene diisocyanates, phenylene diisocyanates, chlorophenyl diisocyanates, cyclohexylene diisocyanates, and methylene bis-cyclohexylene diisocyanates.

Examples of monomeric alcohols include but are not limited to ethylene glycol, 1,3-propanediol, 1,4-butanediol, 1,5-pentanediol, and 1,6-hexanediol.

Examples of polymeric alcohols include but are not limited to polymeric ether and/or ester diols such as a polypropylene glycol, a polyadipate diol, a polycaprolactone diol, a polyphthalate diol, and a polycarbonate diol.

The polyurethane compositions contain at least 80, 90 or 95 weight percent of polyurethane. In one example, the polyurethane in contact with the rubber composition can be entirely composed of polyurethane and no other non-urethane ingredients. The polyurethane compositions can also include fillers to obtain the desired physical properties of the polyurethane composition. Such fillers include but are not limited to carbon black, titanium dioxide, zinc oxide, calcium carbonate, silicas, and coloring pigments.

The polyurethane compositions of the present disclosure can be in the form of any suitable shape, for example, a layer or substrate, that can be brought into contact with a rubber composition for adhering the polyurethane to the rubber compound. In one example, the polyurethane composition can be in the form of a tire component, for example a rim or wheel support.

The polyurethane can be adhered to the rubber compositions by a variety of methods. In one embodiment, the rubber-polyurethane composite can be prepared by a stepwise process. The process can include one or more of the following steps. The adhesion-promoting composition, e.g., a mixture of an alkyl urethane and an aldehyde, can be incorporated into an uncured rubber-containing composition to form a treated rubber composition. The treated rubber composition can be subjected to a heat cycle, for example under pressure, to give a cured rubber composition suitable for adhering to a polyurethane. A heat cycle, as used herein, can include heating a composition, for example from ambient temperature, to a temperature of between 130° C. and 180° C., optionally under a pressure from 50-150 psi, and maintaining the composition at the heated temperature for a period between 15 minutes to 2 hours or 15 minutes and 1 hours, preferably between 145° C. and 165° C., optionally at a pressure from 75-125 psi, for a period between 20 minutes and 45 minutes.

The cured rubber composition can be cooled, for example, to ambient temperature, prior to the next optional process step. The bonding surfaces of the cured rubber composition and polyurethane composition (i.e. the surfaces that contact one another) can be buffed to provide a clean surface and roughened for adhesion. For example, the bonding surfaces can be buffed with a sander such as a hand-held sander. The contact or bonding surfaces of the cured rubber and polyurethane are brought together and the two surfaces in contact with one another are subjected to a heat cycle as described above, for instance, under pressure, to form the composite. The composite can then be cooled to room temperature. In another example, the treated rubber composition in an uncured state can be brought into contact with the polyurethane at a suitable temperature and subjected to a heat cycle, preferably under pressure, to form the composite of the rubber composition adhered to the polyurethane.

The final heat cycle can complete the adhesion process and give a final composite that, once cooled, may have useful properties for a variety of applications that require the flexibility or grip of rubber and the durability of polyurethane, for example, hoses, drive belts, and pneumatic or non-pneumatic tires. In the case of tire construction, the adhesion of the rubber layer and polyurethane substrate can be achieved using the present disclosure where the rubber layer can serve as the tread of the tire or another tire component, e.g., the portion that underlies the tread, and the polyurethane layer can serve as the tire casing or support structure. Thus, the formed composite structure itself can be in the form of a tire or tire component.

The heat-treated composite exhibits improved adhesion between the two bonded layers of the rubber composition and the polyurethane, for example, as observed in a T-peel adhesion test, ASTM D1876. Additionally, the composite can show minimal blooming which otherwise could negatively affect the adhesive tack between the two compositions.

In one or more embodiments, the composite of the present disclosure exhibits an adhesion strength between the contact surfaces of the rubber composition containing an adhesion-promoting composition and the polyurethane of at least 5, 10, 15, 20, 25, 30, 35, 40, 45 or 50 percent higher than the adhesion of the same rubber composition absent the adhesion-promoting composition to the same polyurethane. In another embodiment, the composite of the present disclosure exhibits an adhesion strength between the contact surfaces of the rubber composition containing an adhesion-promoting composition and the polyurethane of at least 5, 10, 15, 20, 25, 30, 35, 40, 45 or 50 Newton/in higher than the adhesion of the same rubber composition absent the adhesion-promoting composition to the same polyurethane. FIG. 1, as described below in the Example, indicates the adhesion strength in Newton per inch measured for multiple rubber compositions adhered to a polyurethane substrate.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., antioxidant, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

Example 1

Preparation of Modified Cured Rubber Layer

The following components were combined in the proportions given in Table 1 and mixed at room temperature for a sufficient period of time to give an uncured rubber compound.

TABLE 1

| Uncured rubber composition | |
|---|---|
| Component | Amount used (PHR) |
| Natural Rubber | 10 |
| Synthetic Rubber | 90 |
| Filler | 75 |
| Softeners | 30 |
| Curatives | 10 |

The uncured rubber compound was then divided into 4 batches. A 1:0.3 mole ratio of a butylurethane:formaldehyde mixture was then added separately to 3 of the 4 batches of uncured rubber compound in amounts of 2, 5, and 10 phr respectively with the last batch of uncured rubber compound containing no butylurethane:formaldehyde mixture. Each batch was separately cured at 145° C. for 33 minutes at 100 psi. The resulting cured rubber compound was then prepared for adhesion by buffing of the bonding surface. Buffing of the surfaces was carried out with a hand-held orbital sander for a sufficient period of time until the surface was visibly changed by the sanding. The bonding surface of the polyurethane substrate was also buffed. The buffed bonding surface of the cured rubber compound was then laminated to the buffed bonding surface of the polyurethane substrate and the resulting laminate was cured at 145° C. for 33 minutes at 100 psi. The polyurethane substrate was based on a mixture of 19.2% toluene diisocyanate and 80.8% tetramethylene glycol. The adhesion strength of the resulting cured rubber-polyurethane composite was measured by a T-peel test using the ASTM D1876 procedure. The rubber-polyurethane adhesion strength based on loading of the butylurethane:formaldehyde mixture is shown in FIG. 1.

As shown in FIG. 1, the composite made with 0 phr of butylurethane:formaldehyde mixture is the baseline measurement of 0 Newton per inch for the T-peel test used in the Examples. The cured rubber composition containing 2 phr of the butylurethane:formaldehyde mixture exhibited an increased adhesion strength to the polyurethane of about 15% greater than the baseline composite, or about 15 Newton per inch greater peel strength. The rubber composition containing 5 phr of the butylurethane:formaldehyde mixture exhibited an increased adhesion strength to the polyurethane of about 40% greater than the baseline composite, or about 40 Newton per inch greater peel strength. Lastly, the rubber composition containing 10 phr of the butylurethane:formaldehyde mixture exhibited an increased adhesion strength to the polyurethane of about 5% greater than the baseline composite, or about 5 Newton per inch greater peel strength.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:
1. A composite comprising:
a. a rubber layer, the rubber layer comprising a tread surface and a first layer surface and the rubber layer comprising an adhesion-promoting composition, the adhesion-promoting composition comprising an alkyl urethane and an aldehyde; and b. a polyurethane substrate adhered to the rubber layer, the polyurethane substrate comprising a first substrate surface, the first substrate surface of the polyurethane substrate being in direct contact with the first layer surface of the rubber layer.

2. The composite of claim 1, the alkyl urethane being selected from the group consisting of:

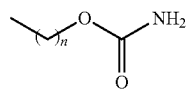

wherein n=2 to 4.

3. The composite of claim 1, the alkyl urethane being butyl urethane.

4. The composite of claim 1, the aldehyde being formaldehyde.

5. The composite of claim 1, the molar ratio of the aldehyde to the alkyl urethane being from 0.1:1 to 0.5:1 and the rubber layer comprising 2 to 10 weight parts of the adhesion-promoting composition per 100 weight parts of rubber.

6. The composite of claim 1, the rubber layer being a tread portion of a tire.

7. The composite of claim 6, the tire being a non-pneumatic tire.

8. The composite of claim 1, the polyurethane substrate comprising at least 90 weight percent of polyurethane.

9. The composite of claim 1, the rubber layer further comprising a reinforcing filler, the reinforcing filler being carbon black or silica.

10. The composite of claim 1, the rubber layer further comprising styrene butadiene rubber, polyisoprene rubber, polybutadiene rubber or natural rubber.

11. A method of adhering a rubber composition to a polyurethane substrate comprising the steps of:
a) mixing a composition, the composition comprising an alkyl urethane and an aldehyde, with a rubber compound to form a treated rubber compound;
b) curing the treated rubber compound by heating to form a cured rubber compound;
c) contacting the cured rubber compound to the polyurethane substrate to form a composite; and
d) heating the composite of the cured rubber compound and the polyurethane substrate to adhere the cured rubber compound to the polyurethane substrate, the polyurethane substrate being in direct contact with the rubber layer.

12. The method of claim 11, the alkyl urethane being selected from the group consisting of:

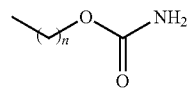

wherein n=2 to 4.

13. The method of claim 11, the aldehyde is formaldehyde.

14. The method of claim 11, the molar ratio of the aldehyde to the alkyl urethane is from 0.1:1 to 0.5:1.

15. The method of claim 11, step b) comprises maintaining the treated rubber compound at a temperature in the range of 130° C. to 180° C. for a time period in the range of 15 minutes to 45 minutes.

* * * * *